(12) United States Patent
Amiconi et al.

(10) Patent No.: US 7,465,760 B2
(45) Date of Patent: Dec. 16, 2008

(54) THICKENED AQUEOUS COMPOSITIONS

(75) Inventors: Fabio Amiconi, Treviso (IT); Fabio Corradini, Mira (IT); Mike Kosub, Bruchsal (DE)

(73) Assignee: Reckitt Benckiser N.V., Hoofddorp (NL)

( * ) Notice: Subject to any disclaimer, the term of this patent is extended or adjusted under 35 U.S.C. 154(b) by 191 days.

(21) Appl. No.: 10/488,399

(22) PCT Filed: Aug. 27, 2002

(86) PCT No.: PCT/GB02/03947

§ 371 (c)(1),
(2), (4) Date: Mar. 2, 2004

(87) PCT Pub. No.: WO03/020649

PCT Pub. Date: Mar. 13, 2003

(65) Prior Publication Data

US 2004/0235989 A1 Nov. 25, 2004

(30) Foreign Application Priority Data

Sep. 4, 2001 (GB) ................................. 0121342.0

(51) Int. Cl.
*A61K 8/73* (2006.01)
(52) U.S. Cl. ........................................ 524/55; 524/514
(58) Field of Classification Search .................. 524/55, 524/514
See application file for complete search history.

(56) References Cited

U.S. PATENT DOCUMENTS

| 4,591,610 A | * | 5/1986 | Grollier ........................ 524/55 |
| 5,788,885 A | * | 8/1998 | Pomrink et al. ................ 516/88 |
| 6,475,970 B1 | * | 11/2002 | Del Duca et al. ............ 510/375 |

FOREIGN PATENT DOCUMENTS

| DE | 41 22 490 A1 | | 1/1993 |
| DE | 4122490 A1 | * | 1/1993 |
| EP | 0758017 A1 | | 2/1997 |
| EP | 0875555 A1 | | 11/1998 |
| EP | 875555 A1 | * | 11/1998 |
| WO | WO 87/04143 A1 | | 7/1987 |
| WO | WO 0027972 A1 | * | 5/2000 |

OTHER PUBLICATIONS

International Search Report for PCT/GB02/03947 dated Dec. 17, 2002.
Combined Search and Examination Report under Sections 17 and 18(3) from The Patent Office in the United Kingdom for GB 0121342.0 dated Feb. 27, 2002.
International Search Report for PCT/GB02/03947 dated Mar. 17, 2002.

* cited by examiner

*Primary Examiner*—Bernard Lipman

(57) ABSTRACT

The invention relates to thickened aqueous compositions which comprise xanthan gum and a water-softening polymer.

22 Claims, No Drawings

THICKENED AQUEOUS COMPOSITIONS

This is an application filed under 35 USC 371 of PCT/GB02/03947

The invention relates to thickened aqueous compositions which contain xanthan gum and at least one water softening agent.

Water softening products are sold commercially (such as the product Calgon®) and are used to aid detergency and prevent the build up of scale in the washing machine, such products are described in EP-A1-0 628 627 (Benckiser), CH-577 937 (Lonza), WO-A1-95/21908 (Henkel) and EP-A2-0 622 449 (Huls).

The use of water-softening polymer polycarboxylates in detergent formulas has provided multiple benefits such as calcium sequestration, crystal growth inhibition to minimize encrustation on fabrics, lime soap dispersancy, and particulate soil dispersion. Sequestration of hardness ions such as calcium and magnesium by the polycarboxylates softens the water and increases detergency. Also sequestration of hardness ions by the polycarboxylates prevents the precipitation of salts of anionic surfactants, which if allowed to occur will lead to reduced detergency. Dispersion of particulate soil such as clay by the polycarboxylates prevents the redeposition of soils on the fabric. Such polymers are now found also in water-softening products.

Conveniently it would be preferred that water-softening products could be added to the washing machine as a liquid rather than as a solid product. Also it is preferable that the product has a viscosity which is greater than that of water.

We have found that aqueous compositions of water-softening polymers are difficult to thicken. In screening for an appropriate gel/thickening system we found that many known systems were not stable or left residues on dark cloths after washing.

WO87/04143 describes a scale removal composition which comprises an alpha-hydroxy carboxylic acid and, optionally, a Na silicate which is thickened with xanthan gum.

We have found that xanthan gum can form a thickened stable gel for water softening agents which is stable and performs well.

Therefore we present as a feature of the invention an aqueous thickened composition comprising:
 a) a water-softening agent which is a water-soluble polymer;
 b) water; and
 c) less than 1.0% wt of a xanthan gum.

Xanthan gum is an acidic, anionic, extracellular heteropolysaccharide, secreted from *X. campestris*. The polysaccharide is thought to act as a protective slime, essential for the pathogenecity of the micro-organism towards its plant host (Rutabaga plant) by blocking fluid flow through the xylem.

Xanthan gum is produced by bacterial fermentation and was the first polysaccharide produced on large scale using *X. campestris*. Such a technique offers the advantage of reproducible physical and chemical properties, with a stable cost and supply. Nevertheless, unlike other microbial extracellular polysaccharides, the composition of the polymer varies with the Xanthomonas strain and culture conditions and in the presence or absence of pyruvate and/or acetate substituents.

The polysaccharide forms highly viscous solutions at low polymer concentrations, which are atypically insensitive to a wide range of salt concentration, pH and temperature. In addition to this, Xanthan solutions exhibit strong shear thinning behaviour showing non-Newtonian behaviour, a measurable yield stress from about 1% polymer concentration, emulsion stabilising and particle suspending abilities, which are all indicative of intermolecular associations.

This natural polysaccharide is widely used in the food industry and to a lesser extent the pharmaceutical industry. Most of the commercial Xanthan samples contain a variable amount of $Na^+$, $K^+$, $Ca^{2+}$ salts, and approximately 30-40% pyruvate content with 60-70% acetate content (although this is subject to variability).

The amount of the water-softening polymer is between 0.1 to 70% wt, ideally, 3 to 50% wt, preferably 15 to 35% wt. Ideally the water-soluble polymer is only partly neutralised.

By the use of the phrase "a water-softening polymer" we preferably mean polycarboxylate polymers, preferably polyacrylate polymers, based on acrylic acid combined with or without other moieties. These include acrylic acid combined with; maleic acid (such as Sokalan CP5 and CP7 supplied by BASF or Acusol 479N supplied by Rohm & Haas); methacrylic acid (such as Colloid 226/35 supplied by Rhone-Poulenc), phosphonate (such as Casi 773 supplied by Buckman Laboratories), maleic acid and vinyl acetate (such as polymers supplied by Huls), acrylamide, sulfophenol methallyl ether (such as Aquatreat AR 540 supplied by Alco), 2-acrylamido-2-methylpropane sulfonic acid (such as Acumer 3100 supplied by Rohm & Haas or such as K-775 supplied by Goodrich), 2-acrylamido-2-methylpropane sulfonic acid and sodium styrene sulfonate (such as K-798 supplied by Goodrich), methyl methacrylate, sodium methallyl sulfonate and sulfophenol methallyl ether (such as Alcoperse 240 supplied by Alco), polymaleates (such as Belclene 200 supplied by FMC), polymethacrylates (such as Tamol 850 from Rohm & Haas), polyaspartates, ethylenediamine disuccinate and organo polyphosphonic acids and their salts such as the sodium salts of aminotri(methylenephosphonic acid) and ethane 1-hydroxy-1,1-diphosphonic acid.

Preferably the polymer is polyacrylic acid, blended with or without a polymaleic acid polymer, or a polyacrylic/polymaleic acid copolymer (such as those sold by BASF under the Sokalan trademark).

The term "partly neutralised" excludes neutralisation of more than 90% of the free carboxyl groups.

Preferably the average MW (Mw) of the polymer should be greater than 1,000, ideally greater than 2,000, based upon the free acid.

Additional water-softening agents may be added to the composition. Preferably the additional water softening agent is a water-soluble water softening agent, which is organic or inorganic. Inorganic water-soluble water softening agents that may be present include alkali metal (generally sodium) carbonate; while organic water-soluble water softening agent which may be present; monomeric polycarboxylates (such as citrates, gluconates, oxydisuccinates, glycerol mono-di- and trisuccinates, carboxymethyloxysuccinates, carboxymethyloxymalonates, dipicolinates and hydroxyethyliminodiacetates); sequestering agents (such as phosphonates and iminodisuccinates); radical scavengers (such as BHT); phosphonates (such as diethylenetriaminepenta (methylene phosphonic acid) and its corresponding pentasodium salt, (available under the trade names Dequest 2060 and Dequest 2066 Monsanto Chemical Co.), DTPMP and DTPMA).

The remaining part of the formulating can be water, with up to 95% w/w of the formulation being water, ideally deionised water.

The presence of surfactant is not excluded from this invention. This invention may find use in the preparation of thickened detergent liquid compositions which contain a water-softening polymer. Preferably the composition contains less than 5% wt, ideally less than 1% wt, of a surfactant.

Organic solvents may optionally be added but are not essential in the present invention and can be any water-miscible organic solvent. Suitable solvents include C3-C12 alkyl glycol ethers and C1-C4 alcohols, such as methanol, ethanol and isopropanol. More preferably, the solvent is selected from the group consisting of EGBE, ethylene glycol hexyl ether ("EGHE") and mixtures thereof. The solvent is typically present in an amount from about 0.5% to about 4.0%, preferably from about 0.75% to about 2.5%, and most preferably from about 1.0% to about 2.0% by weight of the composition. EGBE is available from Union Carbide under the trade name Butyl Cellosolve. EGHE is available under the trade name Hexyl Cellosolve from Union Carbide.

The pH, as defined in the present context, is measured in the neat compositions at 20° C. For optimum stability of these compositions, the neat pH, measured in the above-mentioned conditions, must be in the range of from 3 to 7, ideally from 4 to 6, especially 5.1 to 5.7. The pH of these compositions herein can be regulated by the addition of a Bronsted acid or base.

Xanthan gum is a water-soluble polymer. It is soluble in hot and cold water, as well as being stable in acidic and alkaline conditions (pH 1.5-13). The solubility of Xanthan gum allows highly viscous solutions at low concentrations, i.e., a 1% solution has a viscosity of 800-10000 cps (60 rpm/LVF Brookfield viscometer). Preferred viscosities of solutions generated are 30 to 3000 cps, preferably 500 to 2000 cps, ideally 1000 to 1500 cps, (measured with a Brookfield LVF, spindle 2, 12 rpm @ 20° C.).

Preferred concentrations of xanthan gum are less than 1.00% wt, ideally less than 0.7% wt, preferably less than 0.5% wt, and especially less than 0.4% wt. A preferred source of xanthan gum is Rhodopol T, CAS REG Nr. 11138-66-2 (company Rhodia).

A preservative may be added as are commonly found in the field, such as 1-(3-Chloroallyl)-3,5,7-triaza-1-azoniaadamantane-chloride (CAS REG Nr. 004080-31-3), available as Dowcill 75, at up to 0.1% wt.

An alternative feature of the invention is a method of softening water in a fabric washing machine which method comprises the addition of a composition as defined herein above. Preferably the hardness of the water used in the fabric washing machine is greater than 100 ppm, ideally greater than 150 ppm.

An alternative feature of the invention is the use of xanthan gum in thickening an aqueous composition comprising a water-softening polycarboxylate polymer.

Stability

Initial viscosity: 1000-1400 cps (measured with a Brookfield LVF, spindle 2, 12 rpm @ 20° C.)

The system was stable over a period of 3 months over a range of different conditions.

EXAMPLE

|  | As 100% actives |
| --- | --- |
| Dehardened Sterilized Water | to 100% |
| Sodium Citrate | 10-20 |
| Water softening polymer | 2-10 |
| Xanthan gum | 0.1-1.0 |
| Preservative - optional | 0-0.1 |
| Dye - optional | 0-0.1 |
| Perfume - optional | 0-0.8 |

The invention claimed is:

1. A method of softening water in a fabric washing machine which method comprises the addition of an aqueous thickened water softening composition which consists essentially of:
   a) 2-10% wt. of a water-softening agent which is a partly neutralized water-soluble acrylic/maleic copolymer;
   b) 0-1% wt of a surfactant;
   c) water; and
   d) xanthan gum present in an amount of from 0.1% wt. to less than 1.0% wt. to the water of the washing machine, 10-20% wt. of sodium citrate,
   wherein the aqueous thickened water softening composition comprises 100% wt.

2. A method according to claim 1 wherein the aqueous thickened water softening composition comprises 0.1 to 70% wt of the water-softening agent.

3. A method according to claim 2 wherein the aqueous thickened water softening composition comprises 3 to 50% wt of the water-softening agent.

4. A method according to claim 1 wherein the aqueous thickened water softening composition comprises citric acid or a salt thereof.

5. A method according to claim 1 wherein the aqueous thickened water softening composition has a pH of from 3 to 7, measured at 20° C.

6. A method according to claim 1 wherein the aqueous thickened water softening composition comprises xanthan gum present in an amount of from 0.1% wt. and up to but excluding 0.4% wt.

7. A method according to claim 1 wherein the aqueous thickened water softening composition comprises a surfactant.

8. A method according to claim 1 wherein the aqueous thickened water softening composition comprises an organic solvent.

9. A method according to claim 8 wherein the aqueous thickened water softening composition comprises an organic solvent selected from C3-C12 all glycol ethers, and C1-C4 alcohols.

10. A method according to claim 8 wherein the aqueous thickened waters softening composition comprises an organic solvent selected from the group consisting of: ethylene glycol butyl ether, ethylene glycol hexyl ether, and mixtures thereof.

11. A method according to claim 1 wherein the aqueous thickened water softening, composition comprises a phosphonate.

12. A thickened liquid water softening composition comprising
   a) 2-10% wt. of a water-softening agent which is a water-soluble polymer;
   b) less than 1% wt of a surfactant;
   c) water; and
   d) 0.1% wt. to less than 1.0% wt of a xanthan gum, 10-20% wt. of sodium citrate, wherein the thickened aqueous composition comprises 100% wt.

13. A thickened liquid water softening composition according to claim 10 comprising 0.1 to 70% wt of a water-softening polyacrylate polymer.

14. A thickened liquid water softening composition according to claim 11 comprising 3 to 50% wt of a water-softening polycarboxylate polymer.

15. A thickened liquid water softening composition according to claim 10, wherein the water-softening polycarboxylate polymer is a polymer based on acrylic acid combined with or without other moieties.

16. A thickened liquid water softening composition according to claim 13 wherein the water-softening polycarboxylate polymer is an acrylic/maleic copolymer.

17. A thickened liquid water softening composition according to claim 10 which additionally comprises citric acid or a salt thereof.

18. A thickened liquid water softening composition according to claim 10 which additionally comprises a phosphonate.

19. A thickened liquid water softening composition according to claim 10 wherein the pH of the composition is from 3 to 7, measured at 20° C.

20. A thickened liquid water softening composition according to claim 10 comprising from 0.1% wt. to less than 0.4% wt of a xanthan gum.

21. A method of softening water in a fabric washing machine which method comprises the addition of a thickened liquid water softening composition according to claim 10.

22. A thickened liquid water softening composition according to claim 10 consisting essentially of:
  a) 2-10% wt. water-softening agent which is a water-soluble polymer;
  b) less than 1% wt of a surfactant;
  c) water; and
  d) 0.1% wt. to 1.0% wt of a xanthan gum.

* * * * *